Sept. 1, 1953 — E. P. COVAL — 2,650,834
HAND TRUCK
Filed Dec. 16, 1949 — 2 Sheets-Sheet 1
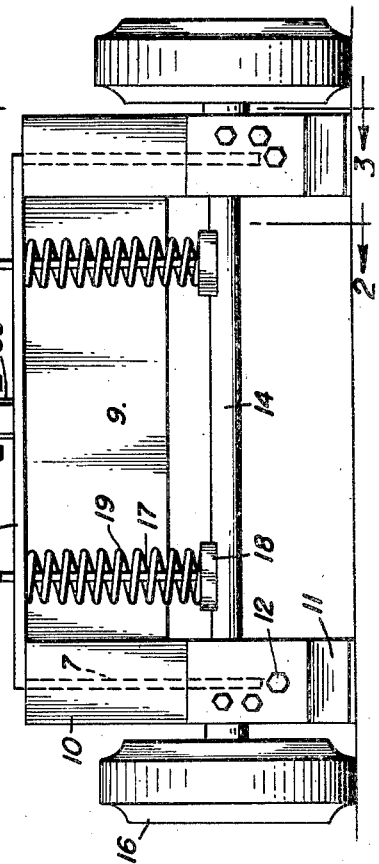
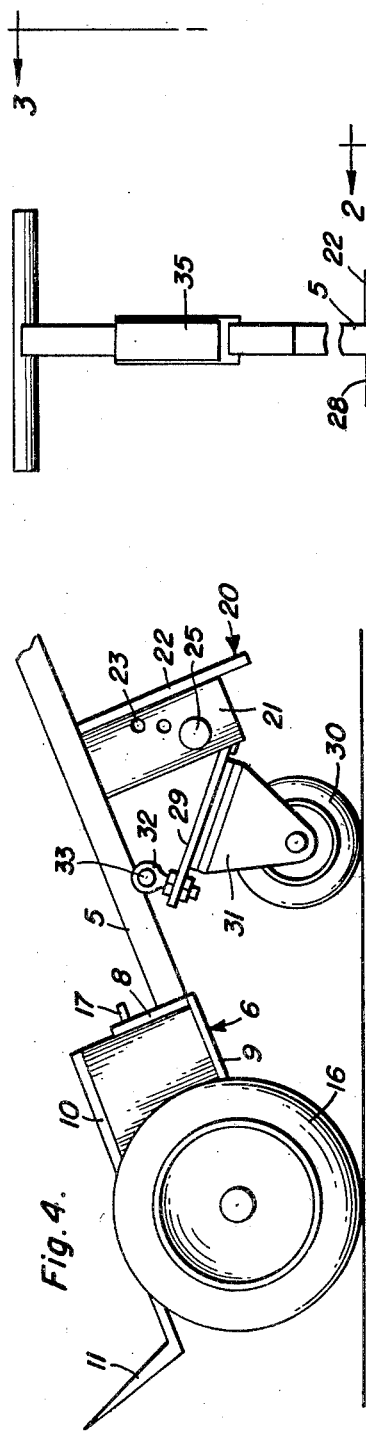
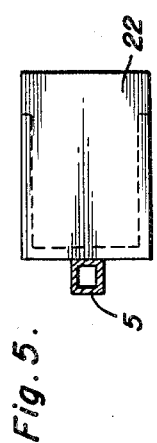
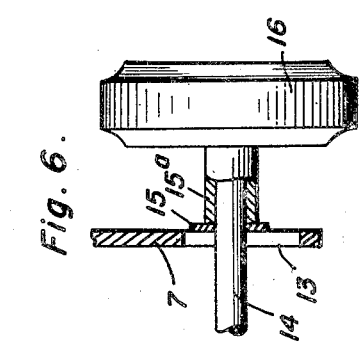
Edwin P. Coval
INVENTOR.
BY
Attorneys

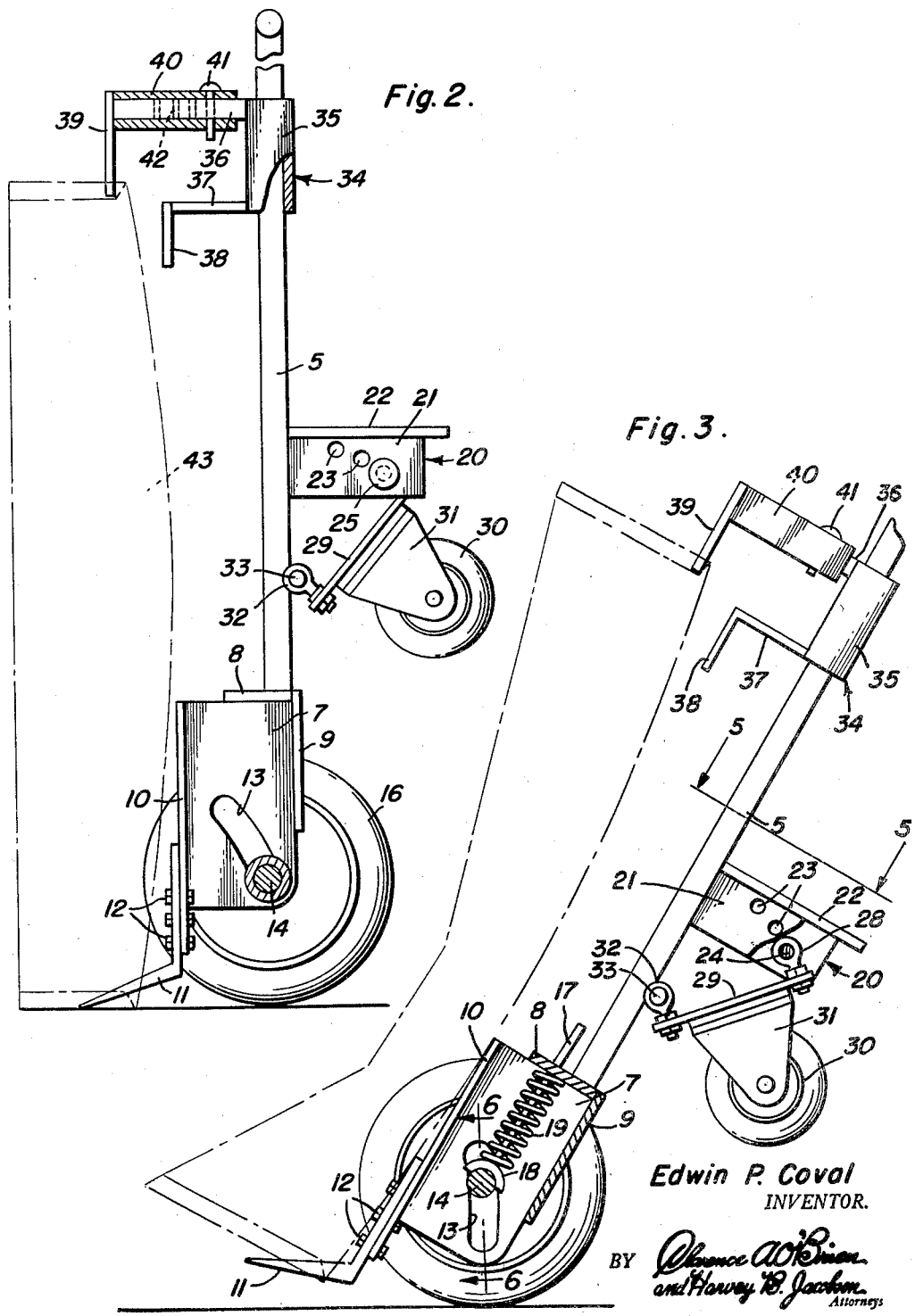

Patented Sept. 1, 1953

2,650,834

UNITED STATES PATENT OFFICE 2,650,834

HAND TRUCK

Edwin P. Coval, Indianapolis, Ind.

Application December 16, 1949, Serial No. 133,230

2 Claims. (Cl. 280—47.2)

The present invention relates to new and useful improvements in hand trucks designed particularly for use with barrels or drums.

An important object of the invention is to provide a three-wheel hand truck on which the load is completely supported to relieve the user from the weight thereof.

Another object is to provide a lower load supporting base with a spring mounting between the main wheels and the base.

A further object is to provide an adjustable clamp for the top of the load.

An additional object is to provide a spring mounting for the main wheels which always keeps them on the floor when loading a drum or other object on the truck.

A still further object is to provide a device of this character of simple and practical construction, which is strong and durable, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view;

Figure 2 is a vertical sectional view taken on a line 2—2 of Figure 1;

Figure 3 is a similar view taken on a line 3—3 of Figure 1 and with the supporting base shown in section;

Figure 4 is a side elevational view showing the truck in its tilted position to travel on all three wheels;

Figure 5 is a sectional view taken on a line 5—5 of Figure 3; and,

Figure 6 is a fragmentary sectional view taken substantially on a line 6—6 of Figure 3.

Referring now to the drawings in detail, wherein for the purpose of illustration I have disclosed a preferred embodiment of my invention, the numeral 5 designates a handle to the lower end of which a lower load supporting base 6 is welded or otherwise suitably secured.

Base 6 comprises a pair of side plates 7 to the upper ends of which a top plate 8 is welded and with a rear cross plate 9 welded to both the rear edges of side plates 7 and top plate 8. Vertical front plates 10 are welded to the front edges of side plates 7 and to the lower portions of which forwardly projecting tapered load supporting arms 11 are secured by bolts and nuts 12.

Side plates 7 are formed with arcuate slots 13 in which an axle 14 is positioned for vertical sliding movement, the axle having washers 15 and sleeves 15a between the wheels and the side plates to prevent sliding movement of the base 6 on the axle. A pair of main wheels 16 are journaled on the ends of the axle.

A pair of rods 17 are slidable in top plate 8 with channeled shoes 18 at the lower ends of the rods held against axle 14 by coil springs 19 positioned on the rods between the shoes and the top plate, the springs supporting the weight of the base section and handle assembly on the axle.

A bracket 20 is welded or otherwise suitably secured to the rear of handle 5 at a point above base 6, the bracket including a pair of side plates 21 and a foot plate 22 welded on top thereof. Side plates 21 are formed with rows of openings 23 in which a rod 24 is selectively received and with a knob 25 on one end of the rod held outwardly by a coil spring 26. A transverse pin 27 carried at the other end of the rod holds the rod in side plate 21.

A pair of eye bolts 28 are rockably connected to rod 24 and are secured to the upper edge of a mounting plate 29 to which a caster wheel 30 is attached by a wheel mounting 31. The lower edge of mounting plate 29 is also provided with a pair of eye bolts 32 rockably connected to a rod 33 welded, as at 33', to handle 5.

An upper load engaging clamp 34 comprises a sleeve 35 slidable on handle 5 and upper and lower arms 36 and 37 projecting forwardly from the sleeve. A fixed lower load engaging holder on hook 38 projects downwardly from the front end of arm 37. An adjustable upper load engaging holder or hook 39 is positioned forwardly of fixed holder 38 and is carried at the front ends of a socket 40 slidable on upper arm 36 and having a locking pin 41 selectively engaged in a row of openings 42 in arm 36 to lock the holder 39 in adjusted position.

In the operation of the device springs 19 hold base structure 6 in a raised position when the truck is unloaded and in order to engage arms 11 under the load, handle 5 is moved into a perpendicular position, as shown in Figure 2 and barrel holder 39 engaged with the upper rim of a barrel 43. Handle 5 is then pulled toward the operator, into the position shown in Figure 3, which rocks the barrel on its rear lower rim and arms 11 slide under the barrel at each side of the point of contact of the lower rim with the ground to support the barrel on the arms. Step plate 22 facilitates tilting the load rearwardly to rest on auxiliary wheel 30.

Upper barrel holder 39 may be adjusted forwardly or rearwardly in accordance with variations in the size or shape of the top of the load. Sleeve 35 is slidable on handle 5 to adjust the holders 38 and 39 according to variations in the height of the load and lower holder 38 is used to engage small kegs or barrels.

The weight of the load is distributed on main wheels 16 and auxiliary wheel 30 to relieve the truckman completely of the strain of supporting or balancing the load, and the auxiliary wheel eliminates the danger of the load tipping rearwardly against the truckman when loading or hauling the load.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A hand truck including a pair of side plates having upper ends, front longitudinal edges and a pair of slots therein, a top plate cross-connecting said upper ends, load pick-up and supporting arms on said edges, a pair of ground wheels, an axle for said wheels traversing said slots and with respect to which said plates are tiltable forwardly and rearwardly for picking up and supporting a load, respectively, by said arms, a handle extending upwardly and rearwardly from said top plate for tilting said side plates, said slots being arcuate and oblique to said front edges of the side plates for floating movement of the axle arcuately transversely of said plates and longitudinally and obliquely of the handle to lower said plates and handle relative to the axle under the weight of a load on said arms, a pair of rods slidable in said top plate with end shoes thereon riding said axle, coil springs on said rods between said top plate and shoes and together with said rods, shoes and top plate yieldingly supporting said side plates on the axle, and a bottom step plate on said handle above said top plate to facilitate tilting of said side plates rearwardly.

2. A hand truck according to claim 1 including an auxiliary ground wheel for supporting the handle when said side plates are tilted rearwardly, an auxiliary wheel mounting having a transverse pivot on said handle for vertical adjustment of said auxiliary wheel in different rearwardly tilted positions of said side plates, and pin and aperture connections in said mounting and step plate, respectively, for holding said auxiliary wheel in adjusted position.

EDWIN P. COVAL.

References Cited in the file of this patent

UNITED STATES PATENTS

| Number | Name | Date |
|---|---|---|
| 490,043 | Rayburn et al. | Jan. 17, 1893 |
| 525,705 | Hannahs | Sept. 11, 1894 |
| 528,251 | Grenier | Oct. 30, 1894 |
| 736,697 | Cummins | Aug. 18, 1903 |
| 820,001 | Kendrick | May 8, 1906 |
| 993,265 | McCoy | May 23, 1911 |
| 1,012,139 | King | Dec. 19, 1911 |
| 1,027,557 | McCoy | May 28, 1912 |
| 1,250,621 | Muir | Dec. 18, 1917 |
| 1,512,454 | Cade | Oct. 21, 1924 |
| 1,513,863 | Sabin | Nov. 4, 1924 |
| 2,346,649 | Bilek et al. | Apr. 18, 1944 |
| 2,360,858 | Ernst | Oct. 24, 1944 |
| 2,506,471 | Siegel | May 2, 1950 |

FOREIGN PATENTS

| Number | Country | Date |
|---|---|---|
| 259,274 | Great Britain | Oct. 12, 1926 |
| 282,214 | Great Britain | Dec. 22, 1927 |
| 459,900 | France | Sept. 19, 1913 |
| 545,825 | Great Britain | June 15, 1942 |
| 601,193 | Great Britain | Apr. 29, 1948 |